United States Patent [19]
Ruffner et al.

[11] Patent Number: 5,689,071
[45] Date of Patent: Nov. 18, 1997

[54] WIDE RANGE, HIGH ACCURACY FLOW METER

[75] Inventors: Donald F. Ruffner; Paul D. Olivier, both of Scottsdale, Ariz.

[73] Assignee: Exact Flow, L.L.C., Scottsdale, Ariz.

[21] Appl. No.: 652,948

[22] Filed: May 24, 1996

[51] Int. Cl.⁶ ..................................... G01F 1/12
[52] U.S. Cl. ........................................ 73/861.84
[58] Field of Search ........................... 73/861.84

[56] References Cited

U.S. PATENT DOCUMENTS

| | | | |
|---|---|---|---|
| 3,241,366 | 3/1966 | Allen | 73/861.84 |
| 3,301,052 | 1/1967 | Lee et al. | 73/861.84 |
| 3,710,622 | 1/1973 | Hammond et al. | 73/861.84 |
| 3,934,473 | 1/1976 | Griffo | 73/861.84 |
| 4,534,226 | 8/1985 | Rose | 73/861.84 |
| 5,509,305 | 4/1996 | Husain et al. | 73/861.84 |

Primary Examiner—Richard Chilcot
Assistant Examiner—Jewel V. Artis
Attorney, Agent, or Firm—Warren F. B. Lindsley

[57] ABSTRACT

A turbine type flow meter incorporating an auxiliary turbine ahead of the main turbine, the auxiliary turbine rotating in the opposite direction from that of the main turbine and serving as a flow conditioner, thereby extending the effective range of the flow meter to lower rates of flow.

4 Claims, 1 Drawing Sheet

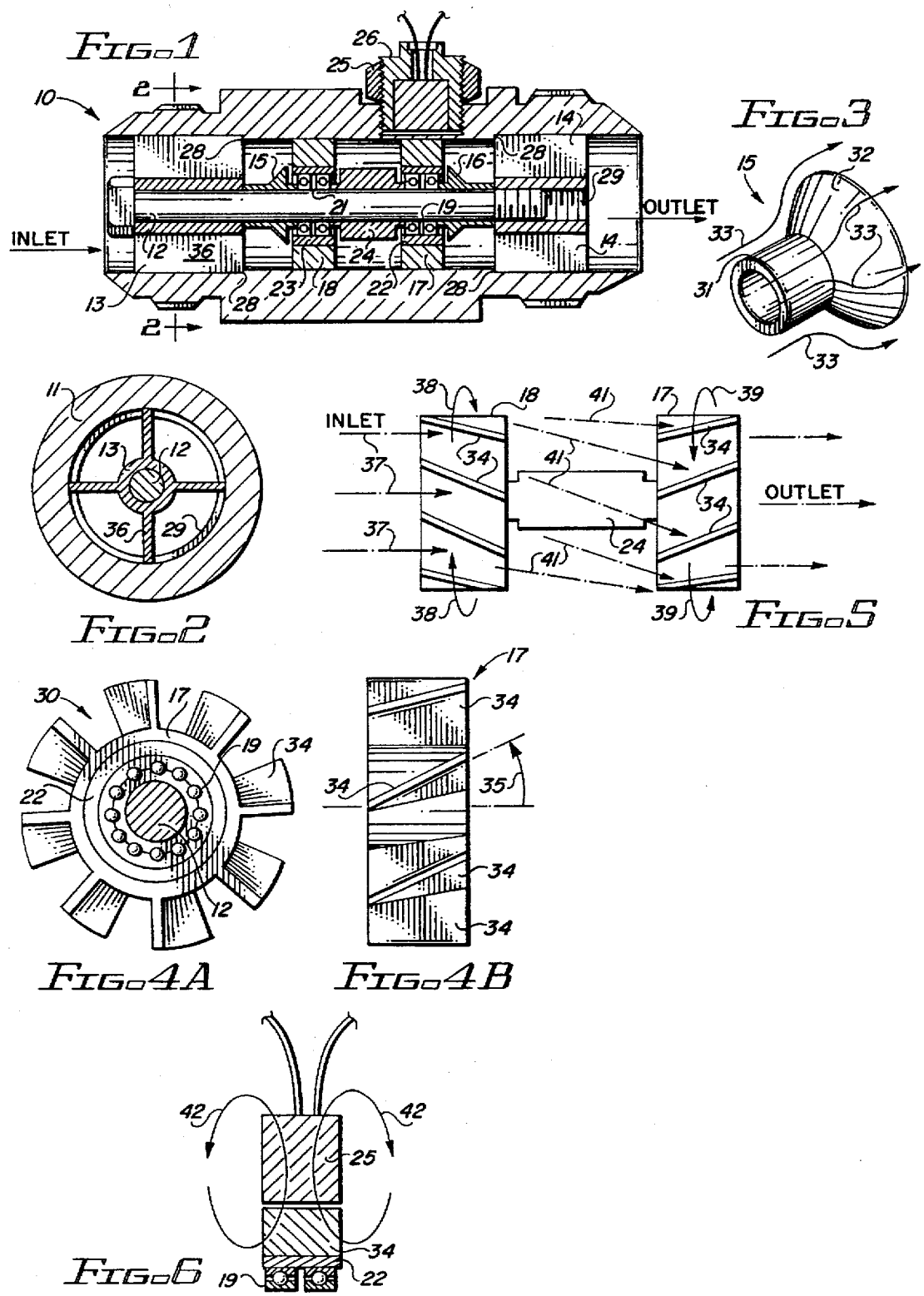

WIDE RANGE, HIGH ACCURACY FLOW METER

BACKGROUND OF THE INVENTION

This invention relates to flow meters of the turbine variety wherein a rotor is turned by the fluid being measured. The turbine rotor turns at a velocity proportional to the rate of flow. The vanes of the rotor passing through the magnetic field of a pickoff coil generate a pulsating signal in the pickoff coil at a frequency that is proportional to the flow rate.

DESCRIPTION OF THE PRIOR ART

Prior art turbine type flow meters typically comprise a single rotor with its pickoff coil together with various means for the preconditioning of the flow pattern ahead of the turbine. While such prior art turbine type flow meters are superior to most other types of flow meters, they still leave considerable room for improved performance in terms of accuracy, linearity, minimization of initial calibration requirements, and especially in terms of measurement range.

SUMMARY OF THE INVENTION

This invention relates to turbine type flow meters incorporating means ahead of the main turbine rotor for optimally shaping and directing the flow pattern as the fluid enters the main rotor.

It is, therefore, one object of the present invention to provide a turbine type flow meter that provides improved accuracy relative to prior art turbine type flow meters.

Another object of this invention is to provide a turbine type flow meter that exhibits improved accuracy over a wider range of fluid flow rates without resort to excessively high revolutions per minute at the maximum rate of flow, such excessively high revolutions per minute being undesirable as they adversely affect bearing life of the turbine flow meter.

A still further object of this invention is to provide a turbine type flow meter that provides improved linearity over the total measurement range.

A still further object of this invention is to provide such an improved turbine type flow meter in a form that eliminates the need for initial calibrations involving the tweaking or filing of rotor blades, bending of straightener vanes, etc. to obtain wide range linearity.

A still further object of this invention is to achieve such improved performance through the incorporation of an auxiliary, oppositely turning rotor ahead of or upstream from the main rotor, the auxiliary rotor serving as the primary means for appropriately directing the flow pattern of the fluid as it enters the main rotor.

Further objects and advantages of the invention will become apparent as the following description proceeds and the features of novelty which characterize his invention will be pointed out with particularity in the claims annexed to and forming a part of this specification.

BRIEF DESCRIPTION OF THE DRAWING

The present invention may be more readily described with reference to the accompanying drawing in which:

FIG. 1 is a simplified side view of the improved flow meter of the invention with the housing cut away to reveal details of the internal construction;

FIG. 2 is a cross-sectional view of the flow meter taken along line 2—2 of FIG. 1 showing the configuration of a flow straightener incorporated in the flow meter of FIG. 1;

FIG. 3 is a perspective view of a transition deflector incorporated in the flow meter of FIG. 1;

FIG. 4A is an end view of the main rotor incorporated in the flow meter of FIG. 1;

FIG. 4B is a side view of the main rotor incorporated in the flow meter of FIG. 1;

FIG. 5 illustrates the effect of the auxiliary rotor upon the flow pattern of the fluid as it enters the main rotor; and FIG. 6 shows the magnetic field of the pickoff coil as it links a passing vane of the main rotor.

DESCRIPTION OF THE PREFERRED EMBODIMENT

Referring more particularly to the drawings by characters of reference, FIGS. 1–4 disclose the improved flow meter 10 of the invention, the flow meter 10 comprising a generally cylindrical housing 11, a shaft 12, an upstream flow straightener 13, a downstream flow straightener 14, an upstream transition deflector 15, a downstream transition deflector 16, a main rotor 17, an auxiliary rotor 18, rotor bearings 19 and 21, bearing spacers 22 and 23, a rotor spacer 24, a pickoff coil 25, standard retainer 26 and lock nut 27.

Housing 11 has a cylindrical longitudinal opening, the central part of which provides clearance for the free rotation of rotors 17 and 18. The inside diameter of this central part is somewhat smaller than the overall outside dimensions of the flow straighteners 13 and 14. At both ends, the inside diameter of the housing is somewhat greater than in the central part and just great enough to receive the flow straighteners 13 and 14 in a snug fit. At the junctions of the smaller diameter of the central part with the larger diameter of the end sections retaining shoulders 28 are formed. The length of the central part is just great enough to receive the two rotors 17 and 18, the rotor spacer 24 and the two transition deflectors 15 and 16; the enlarged outer sections are long enough to receive the flow straighteners 13 and 14.

Shaft 12 has the form of a bolt threaded at the end to mate with matching threads in the central opening 29 of flow straightener 14. The diameter of shaft 12 is just small enough to receive the central circular openings of flow straightener 13, transition deflectors 15 and 16, rotor spacer 24 and the bearings 19 and 21 of rotors 17 and 18. The inlet and outlet ends of the housing are adapted for connection to the fluid lines.

In the assembly of the flow meter 10, the flow straightener 13, transition deflector 15, rotor 18 with its bearing 21 and bearing spacer 23, rotor spacer 24, rotor 17 with its bearing 19 and bearing spacer 22, and transition deflector 16 are first slipped in place over shaft 12 in the order just given. This subassembly is inserted into the inlet side of the housing 11. Straightener 14 is then inserted into the outlet opening of housing 11 and the threaded end of shaft 12 is turned into the threaded central opening of straightener 14. As this threaded connection is tightened, the straighteners 13 and 14 are driven inwardly until their inboard outer diameters bear against the shoulders 28. The positioning of the straighteners 13 and 14 upon shaft 12 against the shoulders 28 is further illustrated by FIG. 2. The shaft 12 and the parts assembled thereon are now centrally supported at both ends by straighteners 13 and 14.

As shown in FIG. 1, with the above assembled parts in place as just described, the pickoff coil 25 is located directly above the main rotor 17 with its axis directed downward so that the passing vanes of the rotor 17 move through the magnetic field of coil 25 as the rotor 17 revolves. The coil 25 is held in this position by its cylindrical retainer 26 which is threaded into an opening in shell 11 and secured therein by lock nut 27. Transition deflector 15 as shown in FIGS. 1 and 3 has a cylindrical section 31 followed by a conical section 32. This configuration tends to provide a smooth transition between the deeper opening of straightener 13 and the shallower opening of rotor 18 with the flow pattern 33 being driven radially outward as shown in FIG. 3.

The rotor assembly 30 is more clearly shown in FIGS. 4A and 4B where rotor 17 is shown to have canted vanes 34 evenly spaced about its periphery. The rotor bearing 19 fits snugly over shaft 12, the bearing spacer 22 fits securely over shaft 12 and between bearings 19 and rotor 17 fits securely over bearing 19. The rotational velocity of the rotor at a given flow rate is dependent upon the number of vanes, the dimensions of the vanes and the angle 35 at which the vanes are mounted. The rotor is made of a magnetic material.

In the operation of the flow meter 10, fluid enters at the inlet end of the meter from the upstream fluid lines as shown in FIG. 1, passing between the vanes 36 of straightener 13 which tend to reduce any turbulence that may be present in the entering fluid.

As the fluid exits the straightener 13, it is deflected outwardly by the conical section 32 of transition deflector 15. This reduces turbulence that would otherwise be introduced by an abrupt change in the fluid opening between deflector 15 and rotor 18.

As the fluid then passes through auxiliary rotor 18, rotor spacer 24 and main rotor 17, the flow pattern is conditioned in accordance with the principles of the present invention as illustrated in FIG. 5. Ideally, fluid enters in a direction parallel with the axis of the flow meter 10 as indicated in FIG. 5 by flow indicators 37. The vanes 34 of rotors 17 and 18 are canted oppositely as shown in FIG. 5. This causes the two rotors to be turned in opposite directions by the passing fluid. Rotation directions for rotors 18 and 17 are indicated, respectively, by rotation indicators 38 and 39. In the process of driving auxiliary rotor 18 in the direction indicated the flow pattern is converted into a swirling pattern as indicated by flow indicators 41. It will be noted that the swirling pattern shown by indicators 41 has rotational energy in a direction opposite the rotational direction 38 of auxiliary rotor 18 and in the same direction as the rotation of rotor 17. This added rotational energy is absorbed by main rotor 17, and is manifested as increased rotational velocity for rotor 17.

The benefit of this enhanced driving force and increased rotational velocity for the main rotor 17 is felt most importantly at low fluid flow rates where bearing friction and other inefficiencies most seriously affect accuracy, linearity and rangeability. By virtue of the improved performance achieved through this preconditioning function of the auxiliary rotor the effective range of the flow meter is extended to lower flow rates than have been achieved in prior art flow meters.

In the design of the two rotors, 17 and 18, the main rotor 17 is designed to rotate at a higher velocity than that of the auxiliary rotor 18. This has been found desirable in terms of maximizing the improvements claimed for the present invention. In a particular implementation at relatively high flow rates, the velocity of the main rotor was found to be roughly 12 percent higher than that of the auxiliary rotor; at the low end of the range with quite a low flow rate, the main rotor velocity was as much as 27 percent higher than that of the auxiliary rotor. This increase in relative velocity for the main rotor at low flow rates verifies and further explains the improvement in accuracy and linearity obtained in the present invention.

The spacing between the two rotors is also important. If the spacing is too close the two rotors tend to interfere hydraulically with each other. If they are too far apart, the flow pattern tends to lose its angular approach. The spacing has been optimized experimentally in existing designs of the flow meter.

When the foregoing design guidelines are observed, there is no need for mechanical calibration of the manufactured product involving the filing of rotor vanes or straightener vanes.

Referring again to FIG. 1, fluid flowing downstream from the main rotor 17 passes over deflector 16 and through straightener 14 to the flow meter outlet to the downstream piping. Deflector 16 again provides a smooth transition between rotor 17 and straightener 14, thereby reducing turbulence that might otherwise be reflected upstream with adverse effects on meter performance.

As in prior art turbine type flow meters, the rotational velocity of the main rotor 17 is sensed by pickoff coil 25. The pickoff coil 25 is excited by an a–c signal or carrier, typically at a frequency on the order of 60 kilohertz. This signal produces a magnetic field 42 as shown in FIG. 6. As the main rotor turns, its vanes 34 pass through the field 42, each successive vane superimposing a pulse upon the carrier waveform of the pickoff coil. The superimposed pulses occur at a repetition rate (pulses per second) proportional to rotor velocity and hence proportional to the measured rate of fluid flow. An external flow rate computer makes the conversion and registers the measured flow rate.

Variations and extensions of the present invention are contemplated and are considered to fall within the scope of the invention.

While the present invention utilizes a single pickoff coil to sense the rotation of the main rotor, a second pickoff coil can be added to sense the rotation of the auxiliary rotor. With both signals available, a failure or malfunction of either rotor would be evidenced through a comparison of the two readings. This effective redundancy provides improved reliability for critical applications. For such applications, two prior art flow meters are typically connected in series. The two-coil version of the present invention can thus constitute a cost saving over the prior art.

The flow meter of the present invention has thus been shown to provide improved range, accuracy, linearity and reliability over prior art designs.

What is claimed is:

1. A turbine type flow meter comprising:
   a housing with an inlet port and an outlet port at opposite ends of a longitudinal cylindrical opening;
   a shaft centrally supported within said cylindrical opening along the axis thereof;
   first and second rotors mounted on said shaft;
   a pickoff coil mounted on said housing and excited by an a–c signal at a given carrier frequency;
   said inlet port and said outlet port being fashioned to facilitate connections to fluid flow passageways through which the rate of fluid flow is to be measured;
   said second rotor being positioned by a rotor spacer a short distance downstream from said first rotor and adjacent said pickoff coil;
   said first and second rotors having oppositely canted vanes which cause said first and second rotors to rotate in opposite directions when a fluid entering said inlet port passes through said first and second rotors and exits said outlet port;

said second rotor having said vanes that are made from a magnetic material;

whereby a fluid flowing through said first and second rotors causes said first and second rotors to turn at velocities proportional to the rate of fluid flow through said flow meter, said vanes of said second rotor passing through the magnetic field of said pickoff coil causing pulses to be superimposed upon said carrier frequency of said a–c signal of said pickoff coil, the repetition rate of said pulses being proportional to the flow rate of said fluid flowing through said flow meter and said repetition rate being convertible to rate of flow values by an external flow rate computer;

said first rotor serving to precondition and alter the flow pattern at the entrance of said second rotor in such a way as to extend the effective metering range to lower flow rates and providing improved accuracy and linearity at such lower flow rates of fluid flow.

2. The turbine type flow meter set forth in claim 1 in further combination with:

first and second transition deflectors;

first and second straighteners, and a rotor spacer;

said rotor spacer being mounted on said shaft between said first and second rotors and defining the spacing between said first and second rotors;

said first transition deflector being mounted immediately upstream from said first rotor;

said second transition deflector being mounted immediately downstream from said second rotor;

said first flow straightener being mounted immediately upstream from said first transition deflector and;

said second flow straightener being mounted immediately downstream from said second transition deflector;

whereby said first and second transition deflectors serve to reduce fluid turbulence at the fluid entrance of said first rotor and at the fluid exhaust of said second rotor; and said first and second flow straighteners serve as means for mounting said shaft of said flow meter in addition to straightening the flow patterns at said inlet and outlet ports of said flow meter.

3. The turbine type flow meter set forth in claim 1 wherein:

said second rotor is designed to rotate at a somewhat higher velocity than the rotational velocity of said first rotor, the difference in said two rotational velocities being more noticeable at the lower end of the metered range.

4. The turbine type flow meter set forth in claim 2 wherein:

said second rotor is designed to rotate at a somewhat higher velocity than that of said first rotor.

\* \* \* \* \*